INVENTOR
HERMANN STEIGER
By Young + Thompson
ATTYS.

United States Patent Office 3,570,237
Patented Mar. 16, 1971

3,570,237
MECHANICAL ENERGIZATION HEAD OF A MECHANICAL REGULATING OSCILLATOR FOR WATCH MOVEMENT
Hermann Steiger, 18 Rue des Paquis, 1201 Geneva, Switzerland
Filed Oct. 28, 1968, Ser. No. 771,043
Claims priority, application Switzerland, Nov. 8, 1967, 15,607/67
Int. Cl. G04c 3/00
U.S. Cl. 58—23                    1 Claim

ABSTRACT OF THE DISCLOSURE

The invention concerns a watch movement regulating device which comprises a mechanical regulating oscillator and an energizing head rigidly connected to said oscillator. The free end of the wire shaped energizing head has a cross section very much smaller than that of the oscillator and enters in successive contacts with the toothing of a regulating wheel of the watch movement which is driven in rotation by the watch winding spring. In this assembly the necessary energy to keep the oscillator in oscillation is derived from the said winding spring and delivered through the intermediary of said regulating wheel and the energization head to said oscillator. The oscillator in its turn regulates, through the intermediary of said energization head, the speed of rotation of the regulating wheel.

---

The present invention concerns regulating means of a watch movement and more particularly a mechanical energization head of a mechanical regulating oscillator, characterized by the fact that it is constituted by a resilient wire shaped member one end of which is fast with the mechanical regulating oscillator, whereas the other one has an end intended to co-operate with the toothing of a regulating wheel of a watch movement the speed of rotation of which is regulated by the said oscillator, by the fact that the energy transferred by the wheel to the point of the resilient wire shaped member upon successive contacts is transmitted, through the intermediary of this resilient wire shaped member to the mechanical regulating oscillator and entertains its oscillation; and by the fact that the potential energy of the oscillator and of the head are in a high ratio so that the influence of the energizing head on the oscillatory mode of the oscillator is negligible.

The attached drawings show schematically and by way of example several embodiments of the mechanical energization head mounted on different mechanical regulating oscillators.

Figure 1:
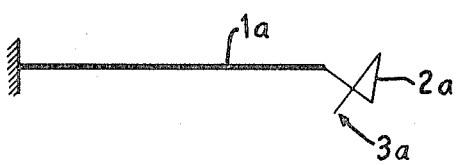
FIGS. 1 and 2 show schematically two embodiments of a mechanical regulating oscillator having the shape of a vibrating blade fast at one of its ends and provided at its free end with different embodiments of the mechanical energization head.

The regulating device of a watch movement shown in the drawings comprises a mechanical regulating oscillator 1 provided with an energization head 2 one free end 3 of which co-operates with the toothing of a regulating wheel 4 of the movement.

Figure 2:
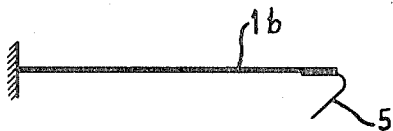

In the embodiments shown in FIGS. 1 and 2, the mechanical regulating oscillator 1a or 1b is constituted by a vibrating blade rigidly fixed at one of its ends and bearing, rigidly fixed on it, a mechanical energization head 2a at its free end.

This mechanical energization head 2a is constituted in the example shown in FIG. 1 by a resilient wire shaped member which is bent twice, one end of which is rigidly fixed, for example welded or glued, on the free end of the vibrating blade 1a. The cross-section of this energization head 2a is smaller than that of the vibrating blade 1a.

In another embodiment shown in FIG. 2, the energization head may be constituted by a part of a rectilinear wire 5 fastened on the vibrating blade 1b, a tuning-fork or a torsion rod. The cross-section of this wire may be circular or polygonal for example. Furthermore the cross-section of this wire has to be at least thirty times smaller than that of the vibrating blade, of the tuning-fork or of the torsion rod on which it is fastened. Furthermore the portion of rectilinear wire constituting the energization head has to make an acute angle with the axis of the vibrating blade, of the arm of the tuning-work or of the torsion rod on which it is fastened.

Figure 3:
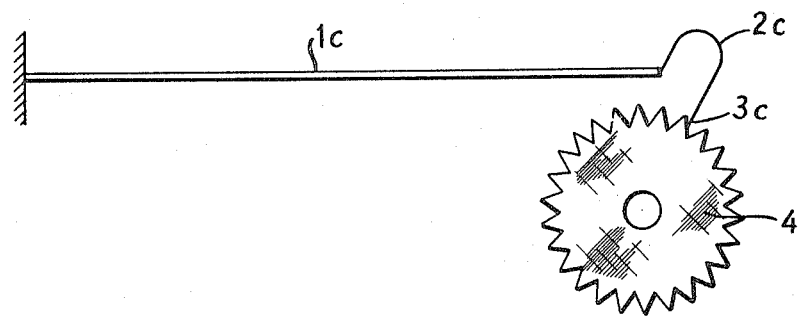
FIG. 3 shows on a larger scale the regulating oscillator provided with an energization head, the free end of the energization head co-operating with the toothing of a regulating wheel.

FIG. 3 shows on a larger scale a variant in which the energization head 2c is constituted by a U-shaped resilient wire member whose cross section is smaller than that of blade 1c.

It is evident that the cross-section of the members constituting the mechanical oscillator and the energization head may be square, rectangular, polygonal, oval, circular etc. without modifying the operation of the regulating device.

To ensure a good operation of the described regulating device, the following conditions have to be realized.

(a) The mounting of the energization head on the mechanical regulating oscillator has to be made at a point on this mechanical oscillator located in the vicinity of its free end.

(b) The mounting of the energization head on the mechanical regulating oscillator has to be rigid and to enable a transfer of energy from the head towards the regulating oscillator with a damping which is as low as possible.

(c) The oscillating frequency of the energization head has to be higher than that of the mechanical regulating oscillator.

(d) The potential energy of the energization head has to be lower than that of the regulating oscillator so that the ratio between these two values will be sufficiently high so that the influence of the energization head on the oscillatory mode of the mechanical regulating oscillator is practically negligible.

The operation of the described regulating device is the following for any of the described embodiments:

The mechanical regulating oscillator (vibrating blade, tuning-fork, torsion rod etc.) oscillates at its own frequency which determines the rotary speed of the regulating wheel 4. In fact the free end 3a or 3c of the energization head is, when the regulating oscillator has reached one of its points where its speed is zero, introduced within the toothing of the wheel 4 and when it has reached its other point with a speed equal to zero, extracted out of mesh with this toothing. In this second position, the wheel 4 is thus free to turn.

However, during each contact between the toothing of the wheel 4 and the free end of the energization head, a certain quantity of energy is transferred through the intermediary of this energization head, which oscillates at a higher frequency than the oscillator, to the mechanical oscillator, thereby maintaining the latter in oscillation.

Generally the oscillation of the mechanical oscillator and that of the energization head take place in the same plane.

The features and the mechanical shapes of the energization head, with respect to those of the mechanical regulating oscillator are such that the free end of the energization head maintains the regulating wheel in a determined angular position up to the moment it escapes the toothing of this wheel. This is important to obtain a good regulation of the movement but can only be obtained if the movements of the mechanical oscillator and of the energization head are such that the end of this head remains, during at least a part of its movement, in a substantially radial direction with respect to the regulating wheel.

To achieve this aim, the part of the head carrying its point is preferably directed radially with respect to the regulating wheel 4.

I claim:

1. In a watch movement including a toothed regulatory wheel driven in rotation by a motor, and a regulating oscillator in the form of a vibrating blade fixed at one end and free at the other end; the improvement in which said blade freely vibrates at its natural frequency and carries rigidly secured to its free end a resilient wire that engages with the teeth of the regulating wheel and that has a cross section at least about thirty times smaller than that of the blade, said smaller cross section extending full length of said wire, said wire extending from said blade away from said wheel and having a loop therein that opens toward said wheel and terminating in a portion that extends toward said wheel.

References Cited

UNITED STATES PATENTS

| 2,654,214 | 10/1953 | Steiger | 58—116 |

FOREIGN PATENTS

| 313,810 | 6/1956 | Switzerland | 58—116 |
| 693,719 | 9/1964 | Canada | 58—23 |

STEPHEN J. TOMSKY, Primary Examiner

E. C. SIMMONS, Assistant Examiner

U.S. Cl. X.R.

310—37